(No Model.)

J. C. GRIMES.
NUT LOCK.

No. 478,997. Patented July 19, 1892.

Witnesses
Chas. A. Ford.
John H. Diggert

Inventor
J. C. Grimes.
By his Attorneys,
C. A. Snow & Co.

THE NORRIS PETERS CO., PHOTO-LITHO., WASHINGTON, D. C.

UNITED STATES PATENT OFFICE.

JAMES CRAWFORD GRIMES, OF JULESBURG, MISSOURI, ASSIGNOR OF ONE-HALF TO JOHN W. JOHNSON, OF SAME PLACE.

NUT-LOCK.

SPECIFICATION forming part of Letters Patent No. 478,997, dated July 19, 1892.

Application filed May 17, 1892. Serial No. 433,322. (No model.)

*To all whom it may concern:*

Be it known that I, JAMES CRAWFORD GRIMES, a citizen of the United States, residing at Julesburg, in the county of Schuyler and State of Missouri, have invented a new and useful Nut-Lock, of which the following is a specification.

My invention relates to improvements in nut-locks of that class in which the nuts are provided at one side of their central bolt-receiving bore with a second smaller bore for the reception of a locking-pin; and the objects in view are to provide such a lock or one embodying this feature, and a pin for the same adapted to interlock with the bolt, and when so interlocked to prevent further rotation of the latter, and, furthermore, to avoid injury of the threads of the bolt.

With these objects in view the invention consists in certain features of construction hereinafter specified, and particularly pointed out in the claims.

Figure 1:
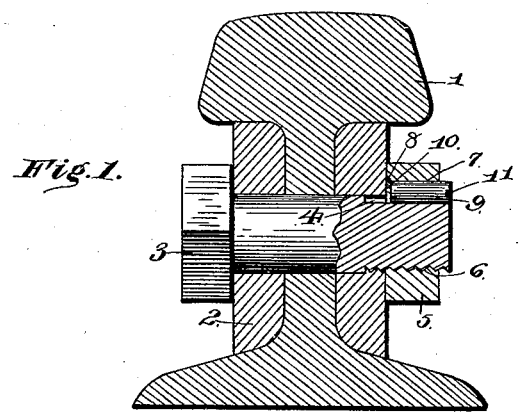
Figure 2:
Figure 3:
Figure 4:
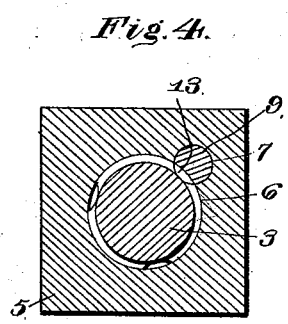

Referring to the drawings, Figure 1 is a longitudinal section of a rail-joint, the bolts of which are provided with nuts locked in accordance with my invention. Fig. 2 is a detail view of the bolt. Fig. 3 is a similar view of the locking-pin. Fig. 4 is a transverse section through the bolt, nut, and pin.

Like numerals of reference indicate like parts in all the figures of the drawings.

1 designates a rail-section; 2, the fish plates or bars, which, like the section, are perforated for the passage of the bolt 3. The bolt 3 is of ordinary formation, with the exception that it is provided at one or more points and at its threaded end with a shallow curved longitudinally-disposed recess or groove 4. Upon the bolt is threaded the nut 5, having the usual centrally-located threaded opening 6, and at one side of the same with the minor perforation 7, the inner end of which is reamed, as at 8. The minor perforation is at one side of the bolt-receiving opening of the nut and communicates therewith.

9 designates a cylindrical locking-pin mounted in the minor perforation of the nut and adapted for rotation therein. The inner end of the pin is upset, as at 10, in the flared rear end of the minor perforation, and the outer end of said pin beyond the face of the nut is provided with a transverse kerf or slot 11, adapted to receive an ordinary screw-driver. By the upsetting of the metal or rear end of the pin the same is prevented from being withdrawn from the nut. The pin is cylindrical and at one side is provided with a series of fragmentary threads 13, which approximate the threads of the nut and register therewith when the pin is in position. By rotating the pin until the threads thereof are in register with those of the nut the nut may be run on the bolt in the usual manner until tightened in position. Such is permissible by reason of the fact that the threads of the nut are completed by the relative location of the threads of the pin. Now by rotating the nut until the pin is opposite one of the grooves of the bolt and then slightly rotating the pin so that its plain cylindrical face will project into the bolt-receiving opening of the nut and grooves of the bolt it will be obvious that the nut is locked against rotation in either direction, and hence cannot be removed by accident.

It will be observed that the device is exceedingly simple and the nut may be readily applied and removed whenever occasion may require, and that no injury whatever to the threads of the bolt will accrue.

Having described my invention, what I claim is—

1. The herein-described nut-lock, the same consisting of the bolt provided with a longitudinal groove, the nut threaded on the bolt and provided at one side of its opening with a perforation, a cylindrical locking-pin mounted in the perforation, a head at one end of the same countersunk into the rear face of the nut, a kerf for the reception of a screw-driver at the outer end of the pin, and a fragmentary thread formed at one side of the pin and adapted to form a continuation of the threads of the nut, substantially as specified.

2. The bolt having the series of longitudinal grooves curved in cross-section, combined with the nut threaded thereon and provided at one side of its opening with a perforation, and the pin mounted for rotation in the perforation and locked against withdrawal and provided at one side with fragmentary threads forming a continuation of those of the nut, substantially as specified.

In testimony that I claim the foregoing as my own I have hereto affixed my signature in the presence of two witnesses.

JAMES CRAWFORD GRIMES.

Witnesses:
H. A. JONES,
A. A. LOGAN.